(12) United States Patent
Gundel et al.

(10) Patent No.: US 7,741,588 B2
(45) Date of Patent: Jun. 22, 2010

(54) METHOD AND DEVICE FOR VARYING A FLIGHT PATH OF A PROJECTILE BY INTENTIONAL TUMBLING OF THE PROJECTILE

(75) Inventors: Bernd Gundel, Neuhaus (DE); Hans-Rainer Graf, Bamberg (DE); Helmut Hammer, Heroldsberg (DE); Günther Thurner, Schwaig (DE)

(73) Assignee: Diehl BGT Defence GmbH & Co. KG., Ueberlingen (DE)

( * ) Notice: Subject to any disclaimer, the term of this patent is extended or adjusted under 35 U.S.C. 154(b) by 0 days.

(21) Appl. No.: 12/331,903

(22) Filed: Dec. 10, 2008

(65) Prior Publication Data
US 2009/0145996 A1 Jun. 11, 2009

(30) Foreign Application Priority Data
Dec. 10, 2007 (DE) ................ 10 2007 059 397

(51) Int. Cl.
*F41G 7/00* (2006.01)
*F41G 9/00* (2006.01)
*F42B 15/01* (2006.01)
*F42B 15/00* (2006.01)

(52) U.S. Cl. ............. 244/3.15; 244/3.1; 244/3.21; 244/3.22; 701/200; 701/207; 701/213

(58) Field of Classification Search ........... 244/3.1–3.3; 89/1.11; 102/501–529, 382–384; 342/357.01–357.17; 701/200, 207, 213–216
See application file for complete search history.

(56) References Cited

U.S. PATENT DOCUMENTS 3,286,630 A * 11/1966 Salmirs et al. ............ 244/3.1
3,612,442 A * 10/1971 Chisel ..................... 244/3.22
3,843,076 A * 10/1974 King et al. ............... 244/3.16
3,860,199 A    1/1975 Dunne
4,356,770 A   11/1982 Atanasoff et al.
4,614,318 A *  9/1986 Gobel ...................... 244/3.21
4,657,208 A *  4/1987 Miller et al. .............. 244/3.22
5,368,255 A * 11/1994 August .................... 244/3.28
5,647,558 A *  7/1997 Linick ..................... 244/3.11

(Continued)

FOREIGN PATENT DOCUMENTS

DE    2264243 C2    1/1985

(Continued)

*Primary Examiner*—Bernarr E Gregory
(74) *Attorney, Agent, or Firm*—Laurence A. Greenberg; Werner H. Stemer; Ralph E. Locher

(57) ABSTRACT

A method for varying the flight path of a missile, in particular of a spin-stabilized projectile, which has an outer wall and which is provided with at least one impulse device. The impulse device can be activated deliberately at a defined time during the flight of the missile. The impulse device is arranged with respect to the longitudinal axis of the missile such that, when it is activated, it generates an impulse that initiates a tumbling movement which causes the flight-path of the missile to be shortened or varied. A spin-stabilized projectile is provided with such an impulse device and it is configured so that the impulse device may be triggered during flight so as to initiate the flight-altering tumbling movement.

7 Claims, 2 Drawing Sheets

U.S. PATENT DOCUMENTS

2003/0038211 A1  2/2003  Trosky et al.

FOREIGN PATENT DOCUMENTS

| | | | |
|---|---|---|---|
| DE | 3345601 | A1 | 6/1985 |
| DE | 3042063 | C2 | 12/1986 |
| DE | 696 07 944 | T2 | 11/2000 |
| DE | 10141169 | A1 | 3/2003 |
| WO | 96/25641 | A2 | 8/1996 |

* cited by examiner

FIG. 1
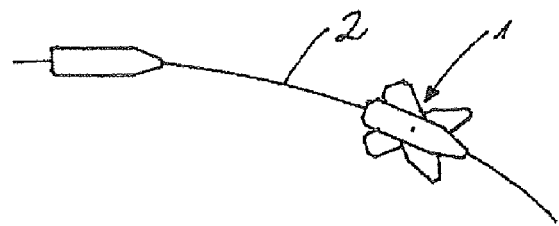
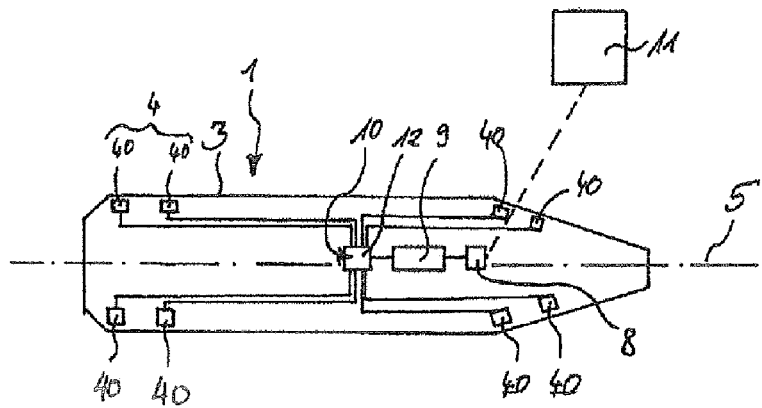
FIG. 2
FIG. 6

METHOD AND DEVICE FOR VARYING A FLIGHT PATH OF A PROJECTILE BY INTENTIONAL TUMBLING OF THE PROJECTILE

CROSS-REFERENCE TO RELATED APPLICATION

This application claims the priority, under 35 U.S.C. §119, of German application DE 10 2007 059 397.1, filed Dec. 10, 2007; the prior application is herewith incorporated by reference in its entirety.

BACKGROUND OF THE INVENTION

Field of the Invention

The invention lies in munitions and projectile technology. The invention relates to a method for varying the flight path of a missile, in particular of a spin-stabilized projectile which has an outer wall, wherein the missile is provided with at least one impulse device. The impulse device can be activated deliberately at a defined time during the flight of the missile.

A method and an apparatus for flight path correction of a ballistic projectile by means of radial thrusts are known from the prior art. Reference is had, by way of example, to U.S. Pat. No. 5,647,558 and WO 96/25641. There, a projectile that is in flight has a radial thrust of a specific magnitude applied to it in order to result in the projectile arriving at a desired target. In that case, information about the projectile path curve and target information are used, using a computer, to determine the precise time and to activate the radial thrust correction. Furthermore, the projectile is provided with a radial impulse motor in order to act approximately on the center-of-gravity of the projectile after the basic combustion thrust, in order to protect the projectile against tumbling.

SUMMARY OF THE INVENTION

It is accordingly an object of the invention to provide a method and an apparatus for varying the flight path of a projectile, in particular of a spin-stabilized projectile, which overcomes the above-mentioned disadvantages of the heretofore-known devices and methods of this general type, such that high projectile target accuracy can be achieved with the influencing elements occupying a minimum amount of space within the projectile, without any parts projecting from the outer wall of the projectile, and possibly dispensing entirely with moving parts. A further object of the invention is to enable step-by-step correction or variation of the flight path, with the entire device having both a simple design and high reliability. A further object is to solve the problem of counterfire data confusion.

With the foregoing and other objects in view there is provided, in accordance with the invention, a method for varying the flight path of a missile, the missile having an outer wall and a longitudinal axis, the method which comprises:
 providing at least one impulse device and arranging the impulse device with respect to the longitudinal axis of the missile such that an impulse originating from the impulse device initiates a tumbling movement causing a shortening or a variation of a flight path of the missile; and
 deliberately activating the at least one impulse device at a defined time during a flight of the missile to initiate the tumbling movement and to thereby deliberately shorten or vary the flight path of the missile.

With the above and other objects in view there is also provided, in accordance with the invention, a spin-stabilized projectile, comprising:
 an outer wall and a longitudinal axis;
 an impulse device for generating an impulse and configured to be deliberately activated at a defined time during a flight of the projectile, said impulse device being disposed, with respect to said longitudinal axis, to initiate a tumbling movement of the projectile at times by generating the impulse and to thereby shorten or vary a flight path of the projectile.

The term "impulse" as used herein is interchangeable with "momentum" in a sense as the term would be understand in a physics environment. Also, the impulse device or momentum device described herein may also be described as a tumbling fuze or a tumbling trigger.

The primary concept of the invention/innovation is that the impulse device is arranged with respect to the longitudinal axis of the missile such that the impulse originating from it for flight-path shortening or variation initiates a tumbling movement, at times, of the missile. If a deliberate tumbling movement is produced, this makes it possible, for example, to reduce the airspeed of the missile and, as a result of this, the range of the missile. A surprising effect in this case is that the tumbling movement, which is otherwise undesirable in the case of missiles and in particular in the case of spin-stabilized projectiles, has a positive influence on the target accuracy of the missile when this tumbling movement is used deliberately. In this case, the impulse device offers a tried and tested means in order to allow a broad spectrum of activation options for a deliberate tumbling movement, by means of the impulse or the impulses which is or are emitted from it.

In one preferred embodiment, the missile is in the form of a spin-stabilized projectile, and particularly in this missile category, an impulse device which produces a tumbling movement at times can be implemented cost-effectively, thus effecting the target accuracy by the manipulation of the flight path, while also reducing the airspeed, in a simple manner. In this case, one advantageous measure is for the impulse which acts from the impulse device on the projectile to act eccentrically on the longitudinal axis of the projectile. The arrangement of the impulse device and of the point of action of the impulse force away from the projectile center-of-gravity or center point increases the degree of tumbling of the projectile in a simple manner, for a constant impulse force magnitude. For example, the impulse can thus act on the nose area and/or the tail area of the projectile. The impulse force vector can preferably run at right angles to the center longitudinal axis of the projectile, but can also include an angle of less than 90° with the center longitudinal axis of the projectile. In consequence, the impulse force can not only act as a lateral displacement vector but also, for example when it is directed forwards, can exert a direct braking effect on the velocity vector of the projectile.

When two impulse devices are arranged in the tail and in the nose area of the missile and are activated at least approximately at the same time and emit pulses which act with respect to one another on the areas of the missile associated with them, a comparable impulse movement to that in the case of just one eccentrically arranged impulse charge can be achieved with little force/energy being applied.

In order to achieve a lateral correction of the flight path, it may be expedient to simultaneously activate at least two impulse devices which are arranged essentially on one projectile cross-section half in the tail area and in the nose area. The magnitudes of the forces which originate from the impulse devices may in this case be designed to be the same or else may be designed to correspond to the behavior of a missile in flight, such that this results not only in a tumbling movement but also in a lateral movement, which is as effective as possible, of the projectile in the original thrust path. For example, the front charge may comprise 60% and the rear charge 40% of the total impulse, as a result of which the drag forces acting on the projectile make it possible to vary the flight path in a predetermined manner laterally with respect to the actual flight path.

Furthermore, it has been found to be advantageous to form the impulse device from a plurality of pyrotechnic impulse charges which are activated deliberately in a stepped manner, and/or for the impulse device to be activated at a defined time during the flight of the projectile. This allows the influence of the impulse device on the flight path of the projectile to be even more defined since, on the one hand, it is possible to produce an impulse effect at different positions in the flight path and, on the other hand, by movement of a moving mass element within the projectile, the center-of-gravity and thus the susceptibility of the projectile to tumbling can be initiated and deactivated in a defined manner. The impulse device, which is formed from a plurality of pyrotechnic impulses, has different impulse intensities for the respective impulse charges. This makes it possible to exert impulses of different magnitude on the projectile, depending on the flight path requirement and/or flight correction requirement.

The impulse device can preferably be in the form of an impulse explosive charge which is fired at the appropriate times and/or depending on the flight path. Additionally or alternatively, the impulse production of the impulse device in the projectile may comprise an internal mass element which is moved deliberately. In a further advantageous refinement of the impulse device which comprises a mass element, the mass element can be fixed in its position within the outer wall. For example, an even number of mass elements may be stored within the projectile and are moved such that they can be released and/or fixed deliberately in order to move the center-of-gravity during flight of the projectile. This makes it possible to move the center-of-gravity of the projectile during flight for example to a first position, then to a second position and then back again to the initial position, and thus to influence the flight path in a defined manner.

In order to reduce the volume required for the impulse device within the projectile, it is expedient for the activation signal to be transmitted to the impulse device in a wire-free manner, as a result of which there is no need for cables or other physical information transmission elements.

The target accuracy of the projectile can be further improved by also taking account of computer-aided information about the weather conditions, wind conditions and/or air thermal distribution for determining the activation time of the impulse device. For example, this can be done in such a way that the location- and/or time-dependent information about the weather conditions, wind conditions and/or air thermal distribution is transmitted to the projectile before it is fired, or, for example, different weather conditions are already stored in the projectile, and a respective, for example weather-dependent, activation scheme just needs to be associated with them.

It has been found to be particularly advantageous for the time for activation signal transmission to the impulse device to be coupled to a local position of the projectile, determined via a GPS signal. This means that the projectile receives a GPS signal during flight and thus determines its own position and, depending on this information, activates the impulse device appropriately.

In this context, it is also advantageous for the actual position of the projectile via GPS data to be compared repeatedly with the nominal position during the flight of the projectile, and for impulses of the impulse device to be activated repeatedly for flight path correction. According to a further refinement of the invention the impulse device is activated at a specific time when the projectile is in a defined roll attitude. The additional consideration of the roll attitude makes it possible to vary the flight path change in a predictable manner, particularly in the case of a lateral flight path change.

For the purposes of an additional function, it is possible that on firing of the projectile, target data is entered, which is arranged in a target area located over the actual target data, and the projectile is deliberately steered to the actual target data by means of one or more tumbling movement phases. Modern anti-artillery units are provided with a so-called counter-fire function which operates in such a way that the anti-artillery unit detects the projectiles fired by the enemy and locates the position of the enemy artillery by calculating back the flight path of the detected projectile and at the same time uses this information for its target data definition. If the target data of the projectile is now set beyond the actual target data and the projectile is steered at the actual real target data by initiating one or more tumbling movements, this results in the projectile having an unconventional flight path which cannot be predicted, and in particular cannot be calculated back, by the enemy. This makes it more difficult, if not impossible, for the enemy to find the location of the artillery using the modified flight path of the projectile.

In addition to the method, the invention also covers a spin-stabilized projectile which has particular invention-specific features. In one preferred refinement of the spin-stabilized projectile, this projectile has an impulse device which comprises a mass element which is mounted such that it can move, at least in phases. In this case, the impulse device may comprise at least two mass elements which are mounted separately and deliberately within the projectile in order—as described above—to initiate a defined center-of-gravity change of the projectile during flight, and in order, if required, to move the center-of-gravity back again to its original position.

In order to further improve the target accuracy of the projectile, one advantageous refinement of the apparatus provides for a GPS receiver and a computer unit for activation of the impulse devices to be arranged within the projectile. These electronic units are fed via an energy store. Furthermore, the spin-stabilized projectile can also be improved by arranging a memory within the projectile, which memory supplies the computation unit not only with the GPS data from the receiver but also with data which allows modification of a regular flight path. This additional information may, for example, include meteorological, weather, target object data and/or data about a sequence, at least some of which is predetermined in advance, of specific impulse activations for fundamental variation of the flight path.

Other features which are considered as characteristic for the invention are set forth in the appended claims.

Although the invention is illustrated and described herein as embodied in a method for stabilizing a projectile and a spin-stabilized ballistic projective with a tumbling fuze, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF SEVERAL VIEWS OF THE DRAWINGS

FIG. 1 is a schematic illustration of the flight path of the projectile and an indicated tumbling movement of the projectile;

FIG. 2 is a schematic illustration of the conventional and modified flight path of a projectile;

FIG. 6 is a schematic longitudinal section taken through an exemplary projectile according to the invention.

DETAILED DESCRIPTION OF THE INVENTION

Figure 3:
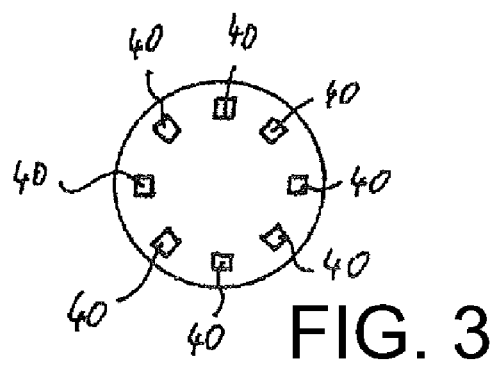
FIG. 3 is a schematic cross-sectional illustration of the projectile with a multiplicity of impulse devices.

Referring now to the Figs. of the drawing in detail and first, particularly, to FIG. 1 thereof, there is shown a spin-stabilized projectile 1 with its flight path 2. A tumbling movement is indicated in the lower position of the projectile 1. As illustrated in drawing FIG. 6, the projectile 1 has an outer wall 3 and an impulse device 4. The impulse device can be activated at a defined time during the flight of the projectile 1, in order to initiate a tumbling movement of the projectile 1. For this purpose, the impulse device is arranged with respect to the longitudinal axis 5 such that a tumbling movement of the projectile 1 can be initiated at times by an impulse I which originates from it. The tumbling motion results in the flight path being shortened or varied. The tumbling movement can be achieved by an off-center arrangement of the impulse devices 4. This is because an arrangement of the impulse device 4 in the nose area 6 and/or in the tail area 7 initiates a tumbling movement when it is activated.

FIG. 2 shows a conventional flight path 2 (dashed line) which the projectile 1 would carry out if no tumbling movement were initiated. The dotted flight path 2' represents the modified flight path 2' which can be produced by activation of the impulse device 4. In this context, the projectile 1 can be fired such that the conventional flight path 2 extends over the actual target 12, that is to say, on firing of the projectile 1, the target data 13 that is entered is arranged in a target area located above the actual target data 12, and the projectile 1 is deliberately steered to the actual target data 12 by means of one or more tumbling movement phases.

Figure 4A:
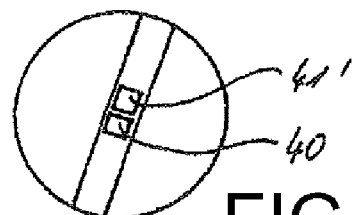
FIGS. 4A-4C are schematic cross-sectional illustrations of an alternative impulse device in various center-of-gravity positions.
Figure 4B:
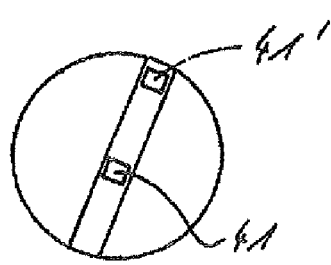
Figure 4C:
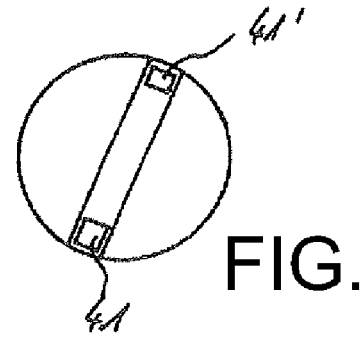

The impulse device 4 may comprise either one or more impulse charges 40 which are in the form of explosive charges (cf. FIG. 6) or are in the form of at least one moveable mass element 41, 41' (cf. FIGS. 4A-4C). By way of example, the impulse charges 40 can be arranged diametrically opposite within the projectile 1, as illustrated in the drawing FIG. 3.

If, as shown in the exemplary embodiment in FIG. 4A to c, the impulse device 4 comprises at least two mass elements, 41, 41', these can be moved separately and deliberately within the projectile 1 such that, starting from a weight distribution (FIG. 4A) whose weight conditions are symmetrical with respect to the projectile center point, an "unbalance" is produced within the projectile by movement of a mass element 41', which "unbalance" is enhanced by the spin stabilization of the projectile, causing the projectile to tumble. If now, on the basis of FIG. 4B, the mass element 41' which has been displaced is moved back to the center again, or the further mass element 41 is likewise moved to a position further away from the center point of the projectile 1, a symmetrical mass distribution can once again be achieved separately and deliberately within the projectile 1 (cf. FIGS. 4A/4C).

In order to allow the flight path of the projectile 1 to be varied during flight deliberately as a function of its flight behavior (altitude, X-Y flight data), which can be determined via a GPS system, it is necessary to provide within the projectile 1 a GPS receiver 8 and a computation unit 9, which activates the impulse charges 40 and/or the mass elements 41, 41' either directly or via an A/D (analog/digital) converter 10. Furthermore, the projectile 1 may have a memory device, which supplies the computer unit 9 not only with the GPS data from the GPS receiver 8 but also with data which allows modification of a regular flight path 2. The data received by the GPS receiver 8 is transmitted by a GPS satellite 11. By way of example, the described analog/digital converter 10 may be a charge fuze element 12 which receives control signals and transmits power signals.

Figure 5A:
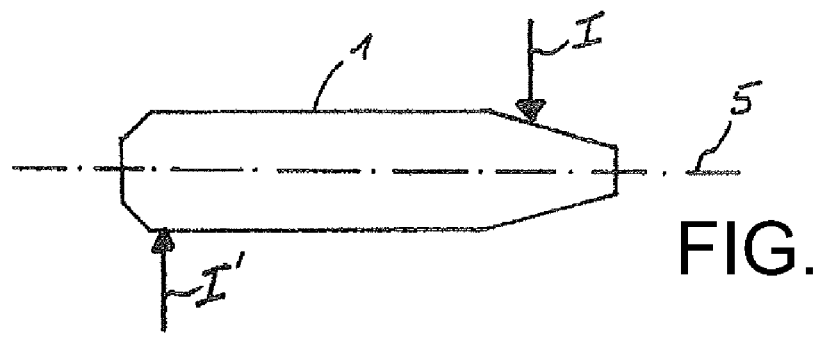
FIG. 5A is a schematic illustration of the impulse forces acting on the projectile during a predominantly tumbling movement.
Figure 5B:
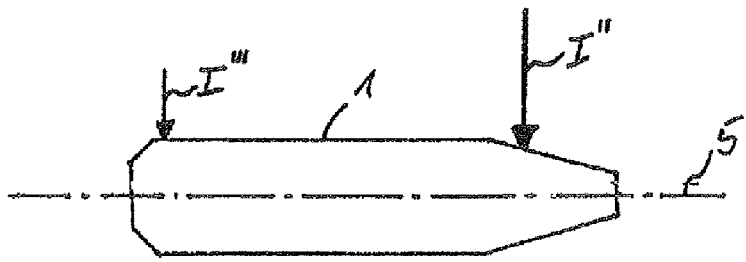
FIG. 5B is a schematic illustration of the impulse forces acting on the projectile during a predominantly lateral flight path variation.

The method of operation of the impulse charges 40 is illustrated in the drawing FIGS. 5A and 5B. On the one hand, the impulse I can act eccentrically (from the longitudinal axis 5) in order to cause a tumbling movement. In addition, a further impulse I can be activated at the same time "diagonally" opposite with respect to the longitudinal section, in order to initiate the tumbling effect more reliably and in a manner which can be calculated better (cf. FIG. 5A). In addition to the tumbling movement, a lateral variation of the flight path 2 is also achieved in FIG. 5B by activating two impulse charges 40 of different intensity on one longitudinal section half of the projectile, such that two impulses I", I'" of different magnitudes act on the projectile. The lengths of the vectors I, I', I", I'" reflect the magnitudes of the impulses I, I', I", I'".

The invention claimed is:

1. A method for varying the flight path of a missile, the missile having an outer wall and a longitudinal axis and an even number of mass elements being mounted within the missile, the method which comprises:

providing at least one impulse device and arranging the impulse device with respect to the longitudinal axis of the missile such that an impulse originating from the impulse device initiates a tumbling movement causing a shortening or a variation of a flight path of the missile;

deliberately activating the at least one impulse device at a defined time during a flight of the missile to initiate the tumbling movement and to thereby deliberately shorten or vary the flight path of the missile;

deliberately moving an internal mass element in the missile for generating an impulse in the missile; and deliberately moving the mass elements during the flight of the missile to thereby produce a movement a center-of-gravity.

2. A method for varying the flight path of a missile, the missile having an outer wall and a longitudinal axis, the method which comprises:

providing at least one impulse device and arranging the impulse device with respect to the longitudinal axis of the missile such that an impulse originating from the impulse device initiates a tumbling movement causing a shortening or a variation of a flight path of the missile;

deliberately activating the at least one impulse device at a defined time during a flight of the missile to initiate the tumbling movement and to thereby deliberately shorten or vary the flight path of the missile, a time for deliberately activating the at least one impulse device being determined by taking into account computer-aided information selected from the group consisting of weather conditions, wind conditions, and air thermal distribution.

3. A method for varying the flight path of a missile, the missile having an outer wall and a longitudinal axis, the method which comprises:
providing at least one impulse device and arranging the impulse device with respect to the longitudinal axis of the missile such that an impulse originating from the impulse device initiates a tumbling movement causing a shortening or a variation of a flight path of the missile;
deliberately activating the at least one impulse device at a defined time during a flight of the missile to initiate the tumbling movement and to thereby deliberately shorten or vary the flight path of the missile; and
timing a transmission of an activation signal to the impulse device in dependence of a current position of the projectile, as determined via a GPS signal.

4. A method for varying the flight path of a missile, the missile having an outer wall and a longitudinal axis, the method which comprises:
providing at least one impulse device and arranging the impulse device with respect to the longitudinal axis of the missile such that an impulse originating from the impulse device initiates a tumbling movement causing a shortening or a variation of a flight path of the missile;
deliberately activating the at least one impulse device at a defined time during a flight of the missile to initiate the tumbling movement and to thereby deliberately shorten or vary the flight path of the missile;
repeatedly comparing an actual position of the missile determined via GPS data with a nominal position during the flight of the missile; and
repeatedly activating impulses of the impulse device, if necessary, for correcting the flight path of the missile.

5. A spin-stabilized projectile, comprising:
an outer wall and a longitudinal axis;
an impulse device for generating an impulse and configured to be deliberately activated at a defined time during a flight of the projectile, said impulse device being disposed, with respect to said longitudinal axis, to initiate a tumbling movement of the projectile at times by generating the impulse and to thereby shorten or vary a flight path of the projectile;
said impulse device including at least one moveable mass element, and
said impulse device including at least two mass elements mounted to be moved separately and deliberately within the projectile.

6. A spin-stabilized projectile, comprising:
an outer wall and a longitudinal axis;
an impulse device for generating an impulse and configured to be deliberately activated at a defined time during a flight of the projectile, said impulse device being disposed, with respect to said longitudinal axis, to initiate a tumbling movement of the projectile at times by generating the impulse and to thereby shorten or vary a flight path of the projectile; and
a GPS receiver and a computer unit for activation of said impulse device disposed inside the projectile.

7. The spin-stabilized projectile according to claim 6, which further comprises a memory device disposed within the projectile and connected to said computer unit, for supplying to said computer unit data enabling a modification of a regular flight path in addition to GPS data from said GPS receiver.

* * * * *